United States Patent
Chen

(10) Patent No.: US 10,992,926 B2
(45) Date of Patent: Apr. 27, 2021

(54) HEAD MOUNTED DISPLAY SYSTEM CAPABLE OF DISPLAYING A VIRTUAL SCENE AND A REAL SCENE IN A PICTURE-IN-PICTURE MODE, RELATED METHOD AND RELATED NON-TRANSITORY COMPUTER READABLE STORAGE MEDIUM

(71) Applicant: XRSpace CO., LTD., Taoyuan (TW)

(72) Inventor: Wei-Shuo Chen, Kaohsiung (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/384,914

(22) Filed: Apr. 15, 2019

(65) Prior Publication Data

US 2020/0329229 A1    Oct. 15, 2020

(51) Int. Cl.
| | |
|---|---|
| *H04N 13/332* | (2018.01) |
| *G02B 27/01* | (2006.01) |
| *G06T 7/73* | (2017.01) |
| *H04N 5/45* | (2011.01) |
| *G06F 3/01* | (2006.01) |

(52) U.S. Cl.
CPC ......... *H04N 13/332* (2018.05); *G02B 27/017* (2013.01); *G06F 3/011* (2013.01); *G06T 7/74* (2017.01); *H04N 5/45* (2013.01); *G02B 2027/0138* (2013.01)

(58) Field of Classification Search
None
See application file for complete search history.

(56) References Cited

U.S. PATENT DOCUMENTS 9,088,787 B1 *   7/2015  Smith .................. H04N 13/279
9,729,864 B2     8/2017  Stafford
(Continued)

FOREIGN PATENT DOCUMENTS

EP     3 370 102 A1    9/2018
JP    2010-515876 A    5/2010
(Continued)

OTHER PUBLICATIONS

Office action dated Oct. 5, 2019 for TW application No. 108117509, filing date: May 21, 2019, pp. 1–6.
(Continued)

*Primary Examiner* — Eileen M Adams
(74) *Attorney, Agent, or Firm* — Winston Hsu

(57) ABSTRACT

A head mounted display system includes a wearable body, an image capturing unit, a display unit and a processing unit. The wearable body can be worn by a user. The image capturing unit is mounted on the wearable body for capturing a real scene of a real environment. The display unit is mounted on the wearable body and for displaying a virtual scene of a virtual environment and the real scene in a picture-in-picture mode. The processing unit is coupled to the display unit and the image capturing unit. The present disclosure allows the user to see the virtual scene and the real scene combined in a same video frame synchronously and help the user to understand a current position or a current state of the user in the real environment, which effectively ensures the user's safety and prevents injuries caused by collision when the user experiences the virtual environment.

22 Claims, 17 Drawing Sheets

(56) References Cited

U.S. PATENT DOCUMENTS

| | | | |
|---|---|---|---|
| 2014/0361976 A1 | 12/2014 | Osman | |
| 2016/0018655 A1 | 1/2016 | Imoto | |
| 2016/0220324 A1 | 8/2016 | Tesar | |
| 2018/0182170 A1* | 6/2018 | Lim | G06T 19/006 |
| 2018/0288354 A1* | 10/2018 | Anderson | A63F 13/5378 |

FOREIGN PATENT DOCUMENTS

| | | |
|---|---|---|
| JP | 2016-189120 A | 11/2016 |
| TW | I626851 B | 6/2018 |
| TW | M573838 U | 2/2019 |
| WO | 2014/162824 A1 | 10/2014 |

OTHER PUBLICATIONS

Search Report dated Oct. 11, 2019 for EP application No. 19172168.7, pp. 1~7.
Office Action dated Jul. 14 2020 for the Japanese Application No. 2019-089495, filing date May 10, 2019, pp. 1-4.

* cited by examiner

HEAD MOUNTED DISPLAY SYSTEM CAPABLE OF DISPLAYING A VIRTUAL SCENE AND A REAL SCENE IN A PICTURE-IN-PICTURE MODE, RELATED METHOD AND RELATED NON-TRANSITORY COMPUTER READABLE STORAGE MEDIUM

BACKGROUND OF THE INVENTION

1. Field of the Invention

The present disclosure relates to a head mounted display system, a related method and a related non-transitory computer readable storage medium, and more particularly, to a head mounted display system capable of displaying a virtual scene and a real scene in a picture-in-picture mode synchronously, a related method and a related non-transitory computer readable storage medium.

2. Description of the Prior Art

With the advancement and development of technology, the demand of interactions between a computer game and a user is increased. Human-computer interaction technology, e.g. somatosensory games, virtual reality (VR) environment, augmented reality (AR) environment, mixed reality (MR) environment and extended reality (XR) environment, becomes popular because of its physiological and entertaining function. A conventional display apparatus, such as a head mounted display (HMD), usually can only display a virtual scene of a virtual environment in a full-screen mode. However, a user cannot see a real scene of a real environment, and therefore, the user cannot be aware of a possible coming accident in the real environment, such as bumping into a real object easily, when the user experiences the virtual environment.

SUMMARY OF THE INVENTION

Therefore, it is an objective of the present disclosure to provide a head mounted display system capable of displaying a virtual scene and a real scene in a picture-in-picture mode synchronously, a related method and a related non-transitory computer readable storage medium for solving the aforementioned problem.

In order to achieve the aforementioned objective, the present disclosure discloses a head mounted display system. The head mounted display system includes a wearable body, an image capturing unit, a display unit and a processing unit. The wearable body is configured to be worn by a user. The image capturing unit is mounted on the wearable body and configured to capture a real scene. The display unit is mounted on the wearable body. The display unit is configured to display a virtual scene and the real scene in a picture-in-picture mode. The processing unit is coupled to the display unit and the image capturing unit.

In order to achieve the aforementioned objective, the present disclosure further discloses a method of utilizing a head mounted display system to display a virtual scene and a real scene in a picture-in-picture mode. The method includes utilizing an image capturing unit of the head mounted display system to capture the real scene; and utilizing a display unit of the head mounted display system to display the virtual scene and the real scene in the picture-in-picture mode.

In order to achieve the aforementioned objective, the present disclosure further discloses a non-transitory computer readable storage medium storing a program that causes a head mounted display system to execute a process. The process includes utilizing an image capturing unit of the head mounted display system to capture a real scene; and utilizing a display unit of the head mounted display system to display a virtual scene and the real scene in a picture-in-picture mode.

In summary, the present disclosure utilizes the display unit to display the virtual scene in the full-screen mode or display the virtual scene and the real scene combined in the same video frame synchronously in the picture-in-picture mode and further utilizes the processing unit to indicate the display unit to switch between the full-screen mode and the picture-in-picture mode in response to the activating command. Therefore, it allows a user to switch the display unit between the full-screen mode and the picture-in-picture mode by different ways to help the user to understand a current position or a current state of the user in a real environment, which effectively ensure the user's safety and prevents injuries caused by collision when the user experiences the virtual environment.

These and other obstruction objectives of the present disclosure will no doubt become obvious to those of ordinary skill in the art after reading the following detailed description of the preferred embodiment that is illustrated in the various figures and drawings.

DETAILED DESCRIPTION

Figure 1:
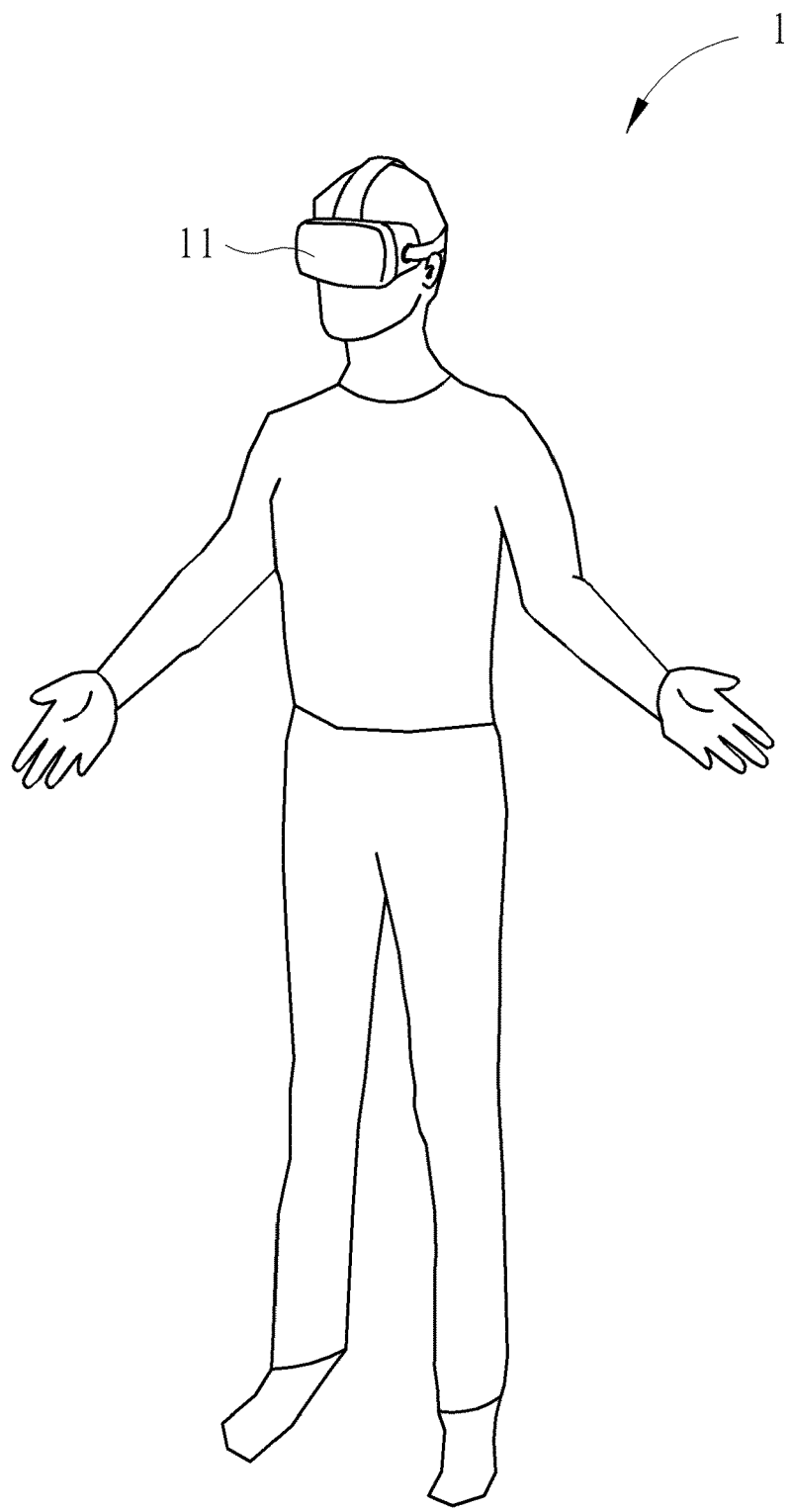
FIG. 1 is a diagram of a head mounted display system according to a first embodiment of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 2:
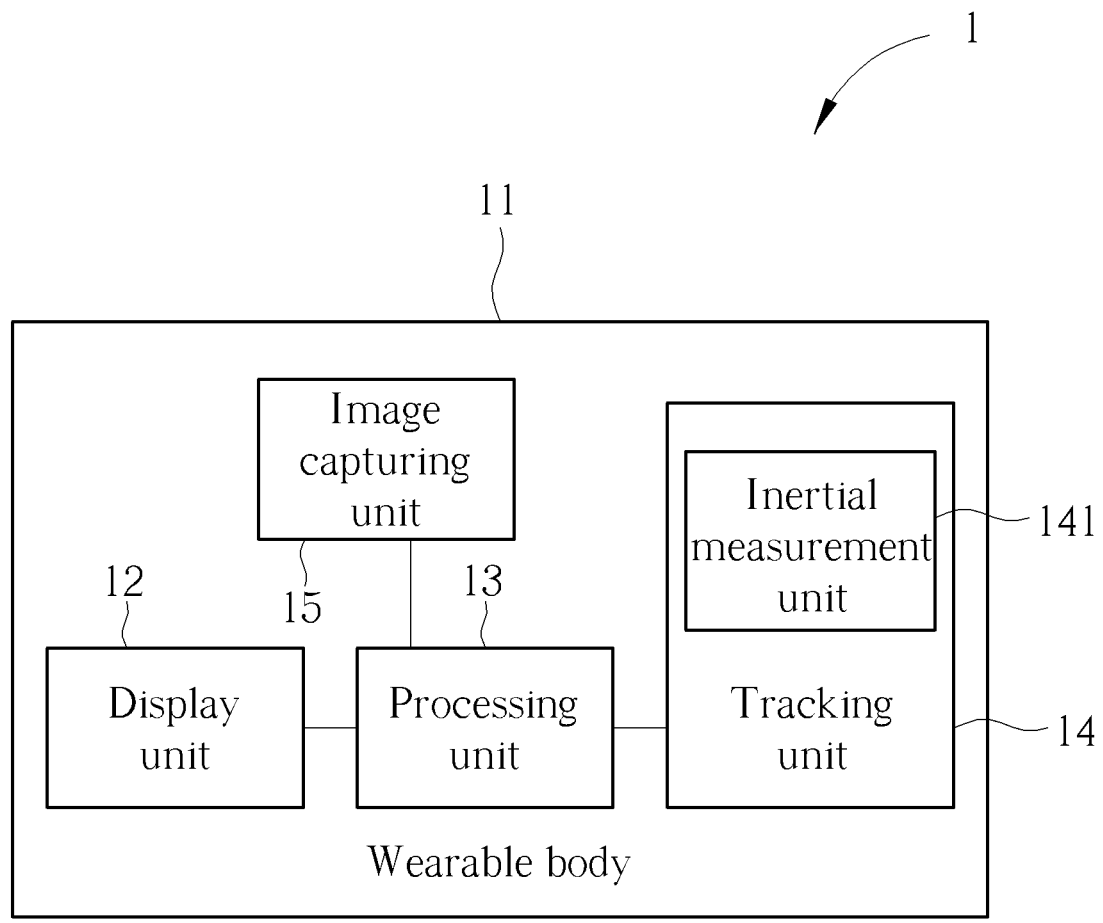
FIG. 2 is a functional block diagram of the head mounted display system according to the first embodiment of the present disclosure.

Please refer to FIG. 1 and FIG. 2. FIG. 1 is a diagram of a head mounted display system 1 according to a first embodiment of the present disclosure. FIG. 2 is a functional block diagram of the head mounted display system 1 according to the first embodiment of the present disclosure. As shown in FIG. 1 and FIG. 2, the head mounted display system 1 includes a wearable body 11, which can be worn by a user, a display unit 12, a processing unit 13, a tracking unit 14, and an image capturing unit 15.

The image capturing unit 15 can be mounted on the wearable body 11 and coupled to the processing unit 13. The image capturing unit 15 is configured to capture a real scene of a real environment. In this embodiment, the image capturing unit 15 can be a camera module. However, the present disclosure is not limited thereto.

The display unit 12 can be mounted on the wearable body 11 and coupled to the processing unit 13. The display unit 12 is configured to display a virtual scene of a virtual environment in a full-screen mode or display the virtual scene of the virtual environment and the real scene of the real environment captured by the image capturing unit 15 combined in the same video frame in a picture-in-picture mode synchronously. The display unit 12 can switch from the full-screen mode to the picture-in-picture mode, and/or to switch from the picture-in-picture mode to the full-screen mode. In this embodiment, the display unit 12 can be a liquid crystal display (LCD), light-emitting diode (LED) display, an organic light-emitting diode (OLED) display, or any other display. However, the present disclosure is not limited thereto.

The processing unit 13 can be mounted inside the wearable body 11. The processing unit 13 is configured to indicate the display unit 12 to switch from the full-screen mode to the picture-in-picture mode, and/or to switch from the picture-in-picture mode to the full-screen mode in response to an activating command. In this embodiment, the processing unit 13 can be implemented in software, firmware, hardware configuration, or a combination thereof. For example, the processing unit 13 can be a processor, such as a central processing unit, an application processor, a microprocessor, etc., or can be realized by application specific integrated circuits (ASIC). However, the present disclosure is not limited thereto.

The tracking unit 14 can be coupled to the processing unit 13 and track a position, an orientation or a pose of the head mounted display system 1. In this embodiment, the tracking unit can include an inertial measurement unit (IMU) 141 mounted inside the wearable body 11, such as a gyroscope, an accelerometer, a magnetic sensor or a combination thereof, for tracking a position, an orientation or a pose of the wearable body 11 to determine the position, an orientation or a pose of the head mounted display system 1. However, the present disclosure is not limited to this embodiment. The inertial measurement unit can be mounted a component another than the wearable body. For example, in another embodiment, the tracking unit 14 can further include a hand sensor, a lower body sensor or an external camera module, and the inertial measurement unit can be mounted the hand sensor, the lower body sensor or the external camera module, for tracking a position, an orientation or a pose of the hand senor, the lower body sensor or the external camera module to determine the position, the orientation or the pose of the head mounted display system 1.

In this embodiment, the tracking unit 14 is configured to collect data for determining generation of the activating command. For example, the activating command can be generated when a tracking result of the tracking unit 14 meets a predetermined condition. However, determination of generation of the activating command is not limited to this embodiment. In another embodiment, which will be described later, the data collected from the tracking unit 14 may not be used to determine generation of the activating command.

Furthermore, in this embodiment, the determination of the generation of the activating command and the generation of the activating command can be performed by the tracking unit 14. However, the present disclosure is not limited thereto. In another embodiment, the tracking unit can transmit the collected data or the tracking result to the processing unit, and the determination of the generation of the activation command and the generation of the activating command can be performed by processing unit.

Furthermore, in this embodiment, the display unit 12, the processing unit 13, the tracking unit 14 and the image capturing unit 15 are disposed on the wearable body 11. However, the present disclosure is not limited to this embodiment. For example, in another embodiment, the head mounted display system further includes a remote computing apparatus disposed away from the wearable body separately and a communication module disposed on the wearable body for constructing a communication channel to the remote computing apparatus. The remote computing apparatus can be an edge computing device, a cloud computing device, a local host computer, a remote sever, a smartphone, or the like. The communication module can establish a wired connection or a wireless connection between elements on the wearable body and elements on the remote computing apparatus. In this embodiment, at least one of the processing unit and the tracking unit can be at least partly disposed or configured on the remote computing apparatus other than the wearable body and/or distributes part of the tasks to the remote computing apparatus, so that the remote computing apparatus can receive the tracking result of the tracking unit or transmit the activating command via the communication module, so as to reduce the size and calculation of the head mounted display, which makes the wearable body lightweight and portable.

Figure 3:
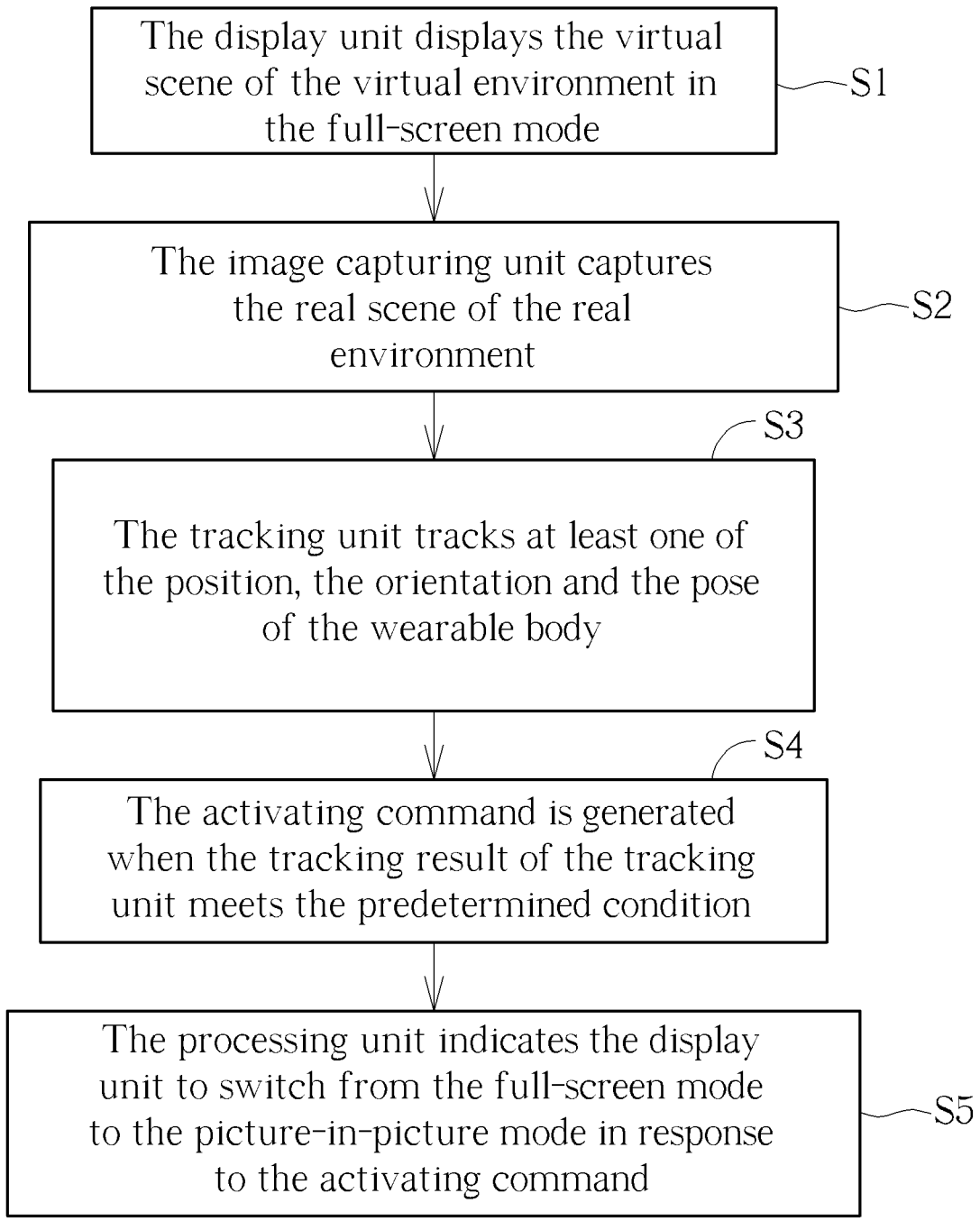
FIG. 3 is a flow chart diagram illustrating a method of switching the head mounted display system between a full-screen mode and a picture-in-picture mode according to the first embodiment of the present disclosure.
Figure 4:
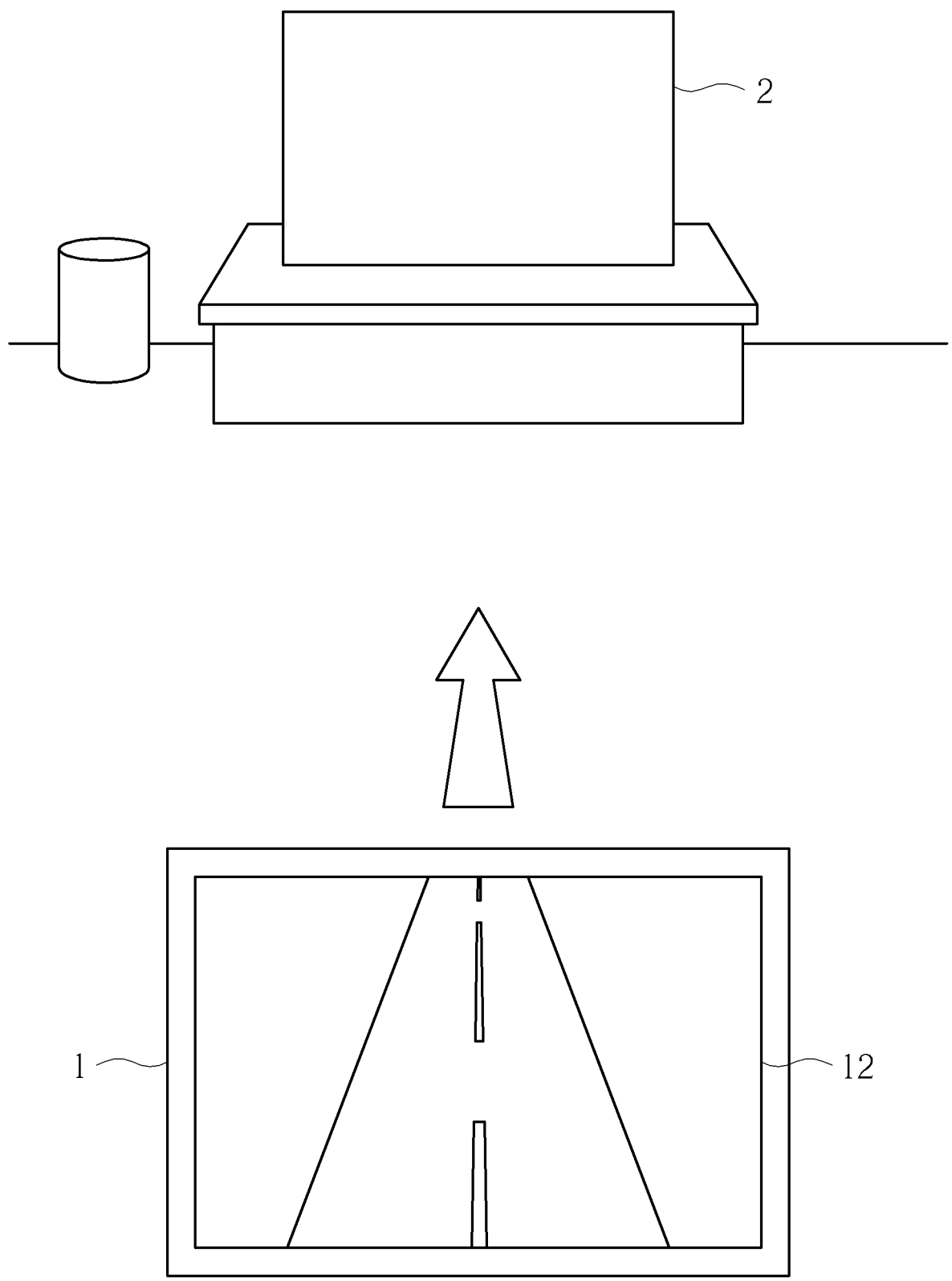
FIG. 4 is a diagram illustrating a display unit displays a virtual scene in the full-screen mode according to the first embodiment of the present disclosure.
Figure 5:
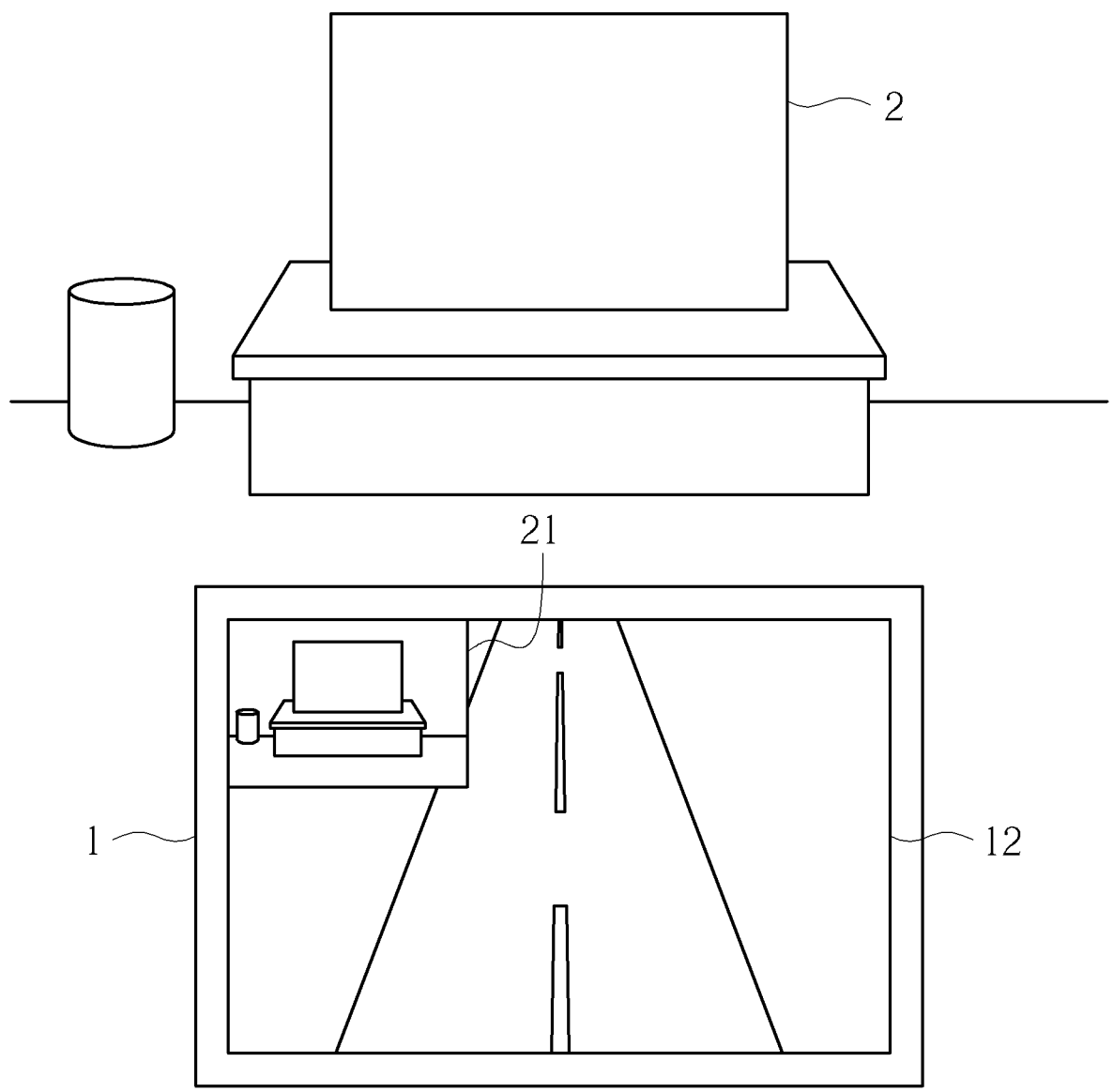
FIG. 5 is a diagram illustrating the display unit displays the virtual scene and a real scene in the picture-in-picture mode according to the first embodiment of the present disclosure.

Please refer to FIG. 3 to FIG. 5. FIG. 3 is a flow chart diagram illustrating a method of switching the head mounted display system 1 between the full-screen mode and the picture-in-picture mode according to the first embodiment of the present disclosure. FIG. 4 is a diagram illustrating the display unit 12 displays the virtual scene in the full-screen mode according to the first embodiment of the present disclosure. FIG. 5 is a diagram illustrating the display unit 12 displays the virtual scene and the real scene in the picture-in-picture mode according to the first embodiment of the present disclosure. As shown in FIG. 3, the method includes the following steps:

S1: The display unit 12 displays the virtual scene of the virtual environment in the full-screen mode.

S2: The image capturing unit 15 captures the real scene of the real environment.

S3: The tracking unit 14 tracks at least one of the position, the orientation and the pose of the head mounted display system 1.

S4: The activating command is generated when the tracking result of the tracking unit 14 meets the predetermined condition.

S5: The processing unit 13 indicates the display unit 12 to switch from the full-screen mode to the picture-in-picture mode in response to the activating command.

Detailed description for the steps is provided as follows. In step S1, when the user wears the head mounted display 10, the display unit 12 can display the virtual scene of the virtual environment in the full-screen mode for the user firstly, as shown in FIG. 4. In steps S2 to S4, when the user experiences the virtual environment, meanwhile the tracking unit 14 can track at least one of the position, the orientation and the pose of the head mounted display system 1 by tracking at least one of the position, the orientation and the pose of wearable body 11 in the real environment, and the image capturing unit 15 can capture the real scene of the real environment. Furthermore, the activating command is generated when the tracking result of the tracking unit 14 meets the predetermined condition. The predetermined condition can be determined according to a relation between the head mounted display system 1 and the real environment.

For example, the predetermined condition can refer to that a distance between the wearable body 11 worn by the user and a real object, such as a television 2 which is shown in FIG. 4 and FIG. 5, or a wall, in the real environment is equal to or less than a predetermined distance. The predetermined distance can preferably be 50 centimeters. In other words, when the distance between the wearable body 11 and the real object in the real environment is equal to or less than 50 centimeters during movement of the user, the activating command is generated, which can provide a warning message for the user to avoid collision.

However, the predetermined condition is not limited thereto. In another embodiment, the predetermined condition can refer to a predetermined orientation or a predetermined pose, and the activating command can be generated when the orientation or the pose of the head mounted display system tracked by the tracking unit meets the predetermined orientation or the predetermine pose.

Alternatively, in another embodiment, which will be described later, the tracking unit can further include a camera module, a hand sensor worn on the user's hand, a lower body sensor worn on the user's low body, or a combination thereof for determining a hand gesture of the user, a hand movement of the user or a lower body movement of the user, and the predetermined condition can refer to a predetermined hand gesture, a predetermined hand movement, a predetermined lower body movement, or a combination thereof, and the activating command can be generated when the hand gesture, the hand movement, or the lower body movement of the user tracked by the tracking unit meets the predetermined hand gesture, the predetermined hand movement, or the predetermined lower body movement.

Alternatively, in another embodiment, the tracking unit can only be omitted, and the image capturing unit is further configured to track at least one of a hand gesture of the user, a hand movement of the user, a lower body movement of the user, a position of the head mounted display system, an orientation of the head mounted display system and a pose of the head mounted display system according to images captured by the image capturing unit.

Afterwards, in step S5, the processing unit 13 can indicate the display unit 12 to switch from the full-screen mode, as shown in FIG. 4, to the picture-in-picture mode, as shown in FIG. 5, in response to the activating command, so as to allow the user to see the virtual scene and the real scene combined in the same video frame at the same time and help the user to understand a current position or a current state of the user in the real environment, which effectively ensure the user's safety and prevents injuries caused by collision when the user experiences the virtual environment.

Besides, a size or a location of a window 21 of the real scene displayed in the picture-in-picture mode can be adjusted when the tracking result of the tracking unit 14 or the image capturing unit 15 meets a predetermined condition. For example, the user can adjust the size or the location of the windows 21 of the displayed real scene by a specific hand gesture and/or a specific hand movement. For another example, the size or the location of the windows 21 can be auto-adjusted based on a tracking result (for example, an eye tracking result) of the tracking unit 14 for providing better user experience.

Understandably, if the distance between the wearable body 11 and the real object increases again and is greater than the predetermined distance, such as 50 centimeters, the display unit can be switched from the picture-in-picture mode to the full-screen mode for enhancing the immersive experience.

Figure 6:
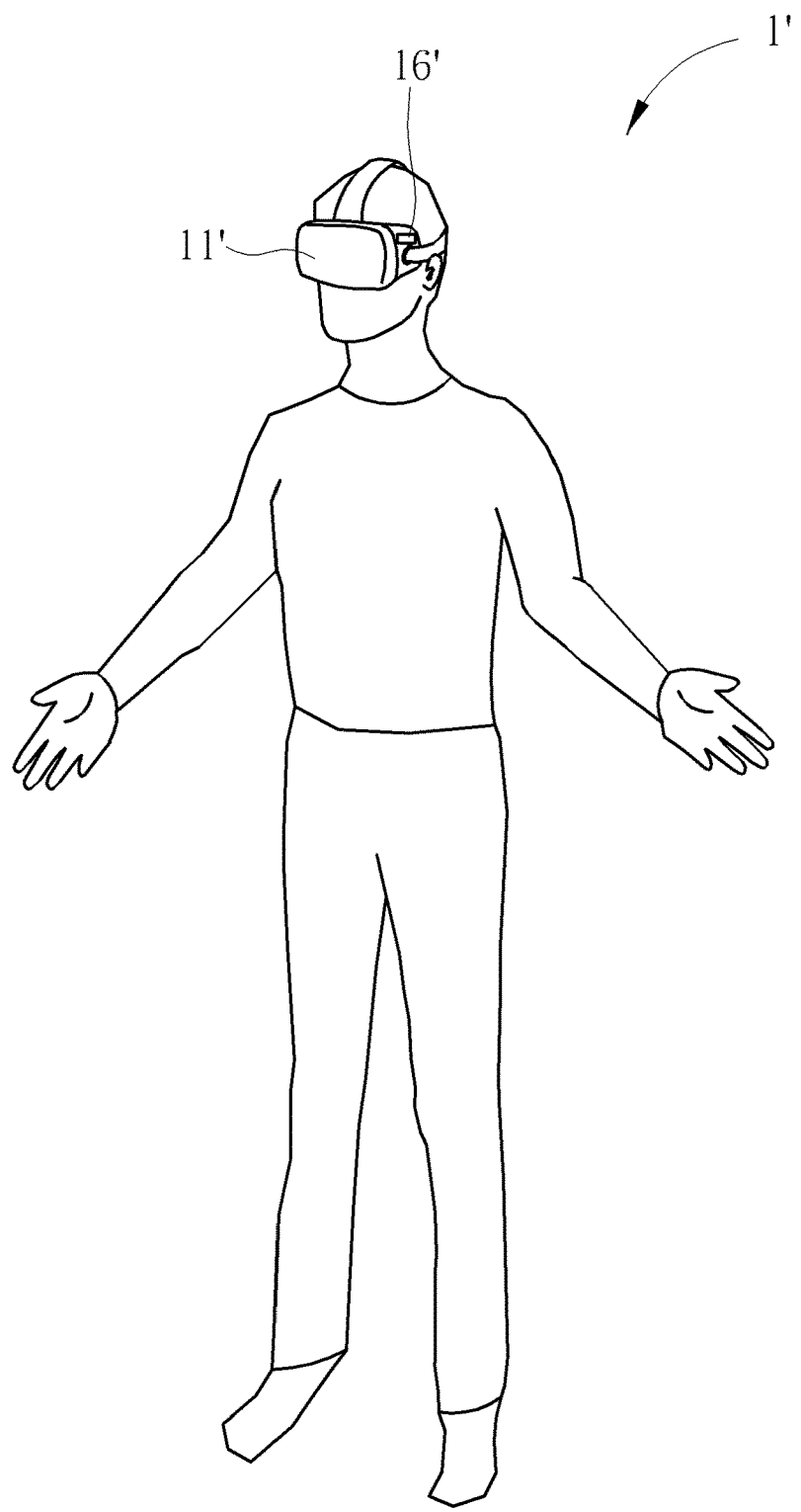
FIG. 6 is a diagram of a head mounted display system according to a second embodiment of the present disclosure.
Figure 7:
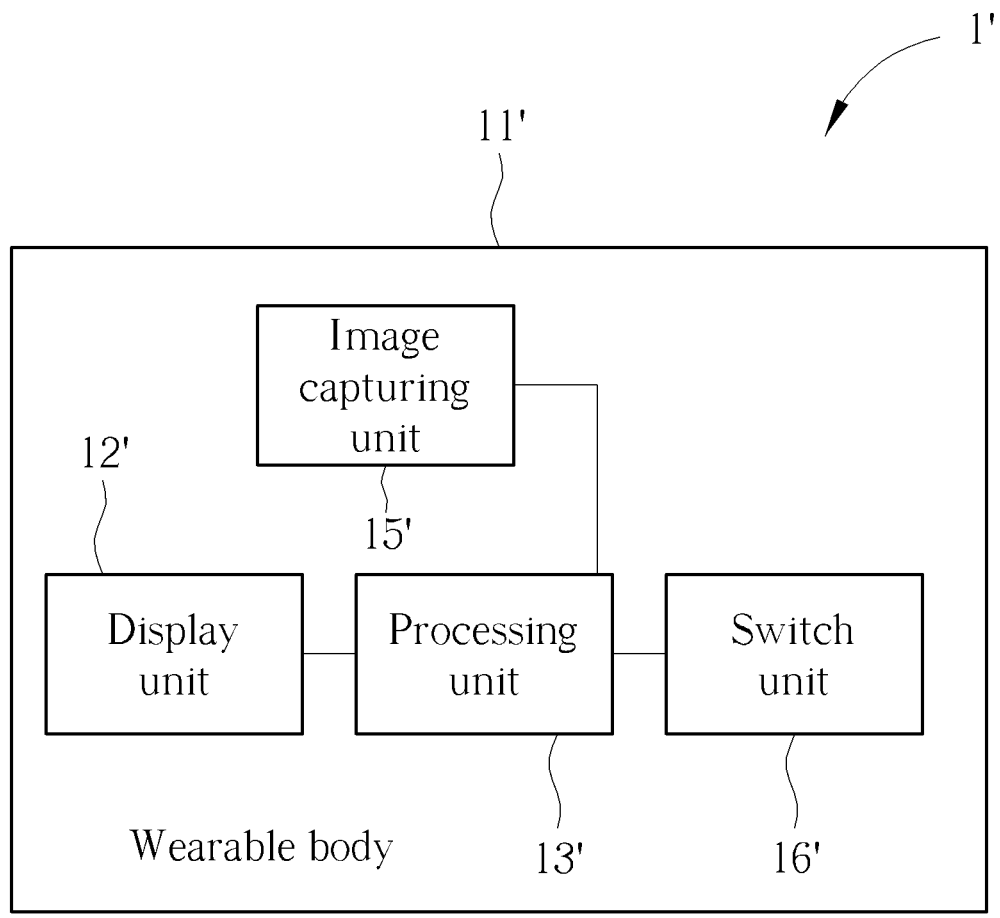
FIG. 7 is a functional block diagram of the head mounted display system according to the second embodiment of the present disclosure.
Figure 8:
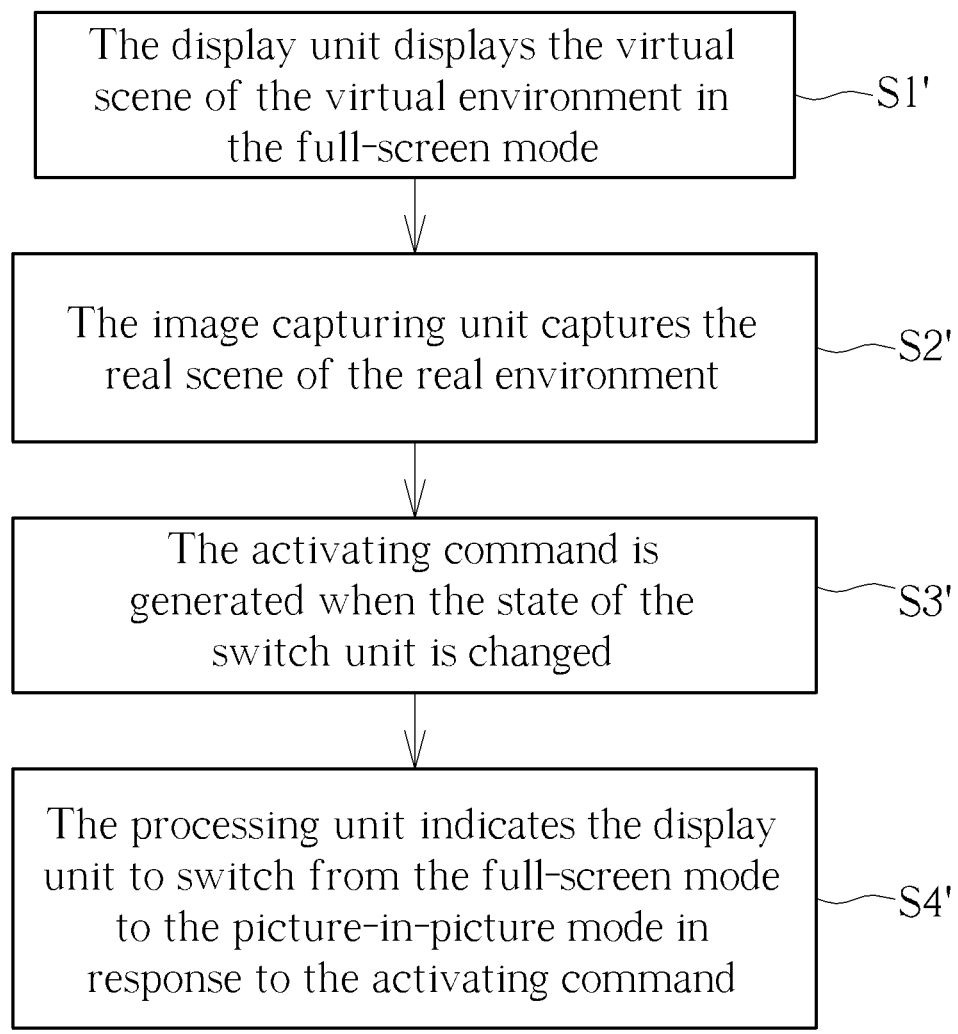
FIG. 8 is a flow chart diagram illustrating a method of switching the head mounted display system between a full-screen mode and a picture-in-picture mode according to the second embodiment of the present disclosure.

Please refer to FIG. 6 to FIG. 8. FIG. 6 is a diagram of a head mounted display system 1' according to a second embodiment of the present disclosure. FIG. 7 is a functional block diagram of the head mounted display system 1' according to the second embodiment of the present disclosure. FIG. 8 is a flow chart diagram illustrating a method of switching the head mounted display system 1' between a full-screen mode and a picture-in-picture mode according to the second embodiment of the present disclosure. As shown in FIG. 6 to FIG. 8, different from the head mounted display system 1 of the first embodiment, the head mounted display system 1' of this embodiment includes a wearable body 11', a display unit 12', a processing unit 13', an image capturing unit 15' and a switch unit 16'. The image capturing unit 15' is disposed on the wearable body 11'. The display unit 12' is disposed on the wearable body 11'. The processing unit 13' is disposed on the wearable body 11' and coupled to the display unit 12' and the image capturing unit 15'. The switch unit 16' is disposed on the wearable body 11' and coupled to the processing unit 13' for generating the activating command when a state of the switch unit 16' is changed. In other words, in this embodiment, the user can switch the display unit 12' from the full-screen mode to the picture-in-picture mode by changing the state of the switch unit 16' according to practical demands. Furthermore, understandably, the user can switch the display unit 12' from the picture-in-picture mode to the full-screen mode by changing the state of the switch unit 16' again. Besides, in this embodiment, the switch unit 16' can include a physical button on the wearable body 11', and the state of the switch unit 16' can be changed by pressing or clicking the physical button. However, the present disclosure is not limited thereto. In another embodiment, the switch unit also can be a virtual button on the wearable body or displayed by the display unit and be activated or deactivated by touch operation.

Figure 9:
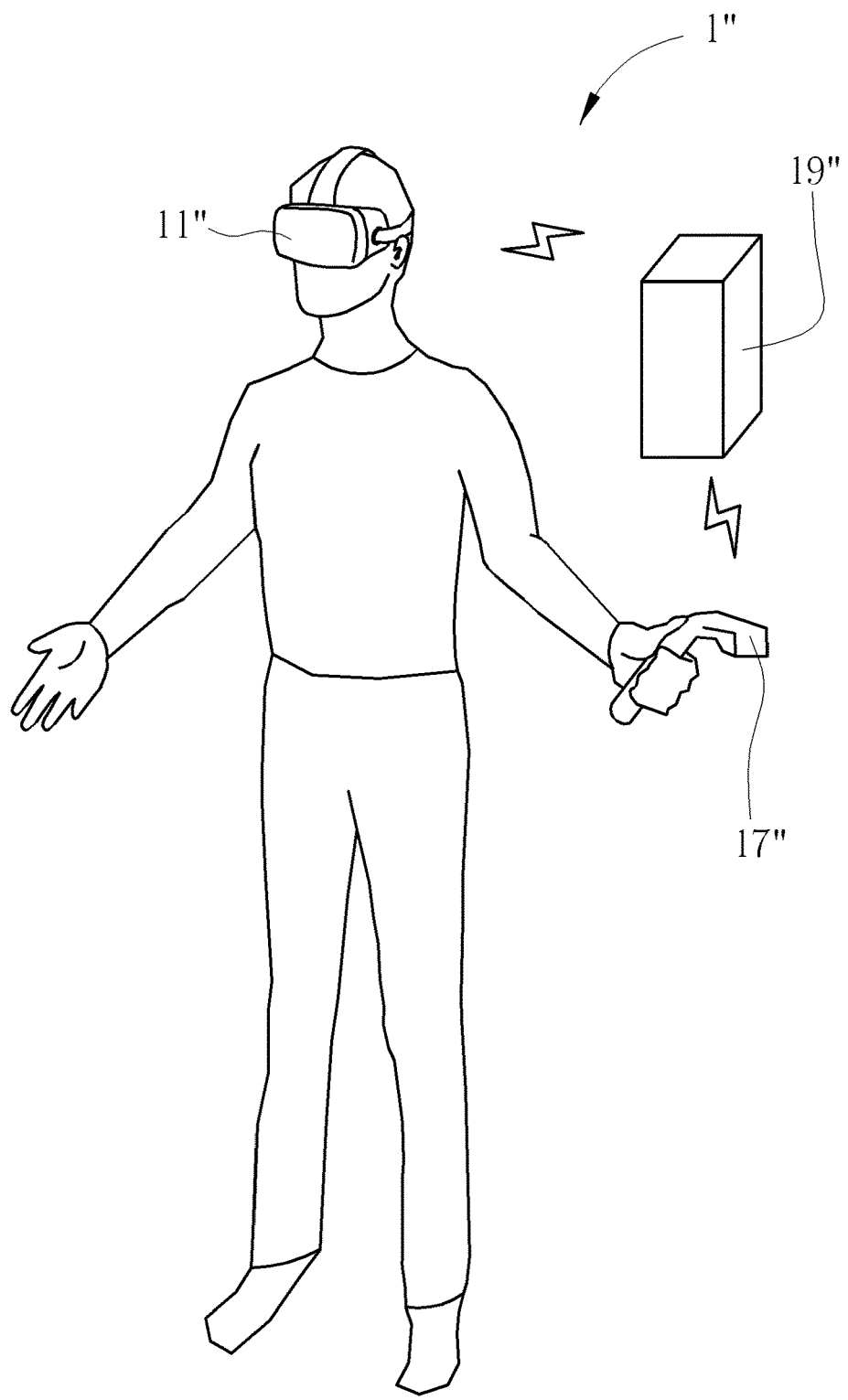
FIG. 9 is a diagram of a head mounted display system according to a third embodiment of the present disclosure.
Figure 10:
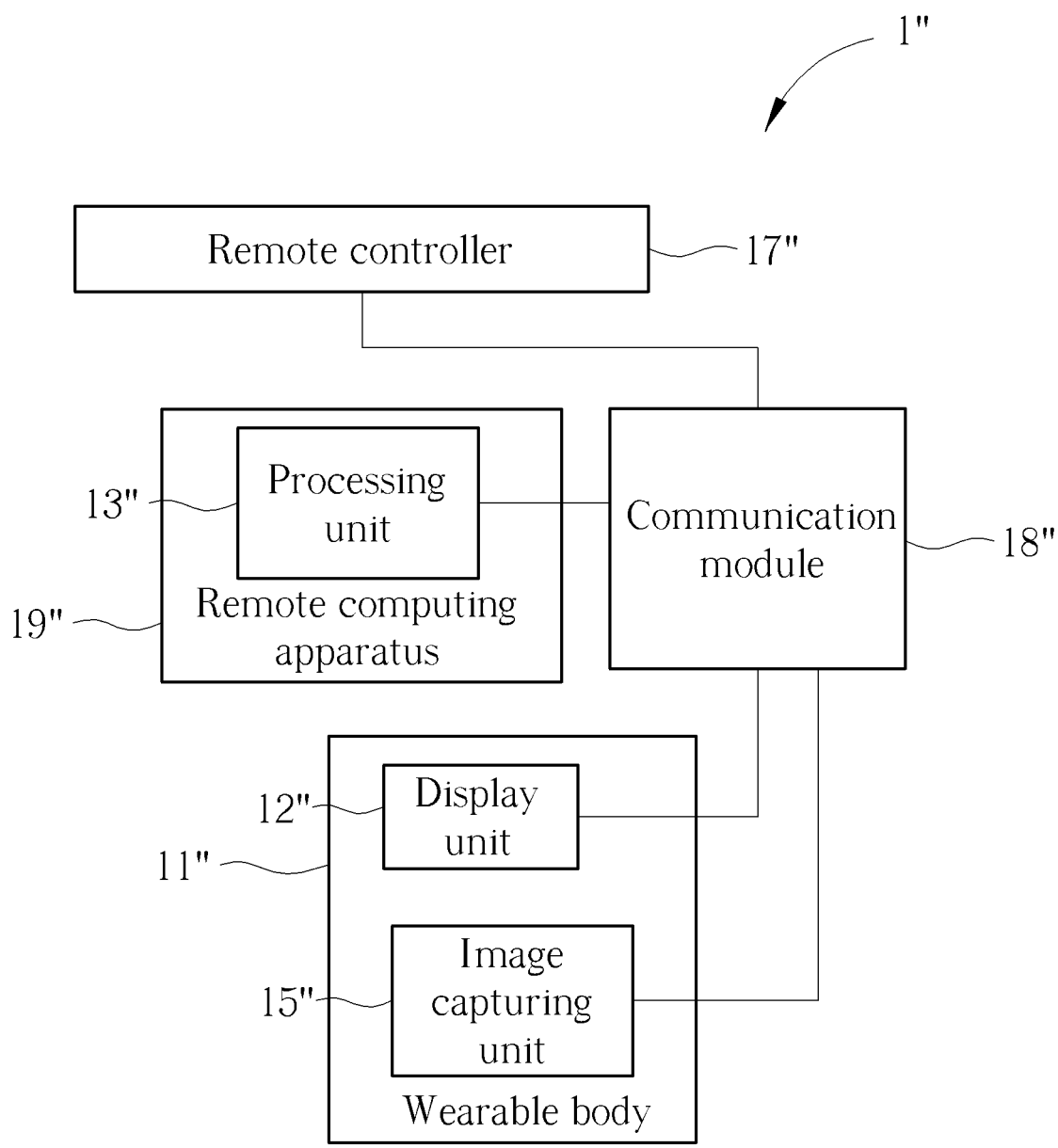
FIG. 10 is a functional block diagram of the head mounted display system according to the second embodiment of the present disclosure.
Figure 11:
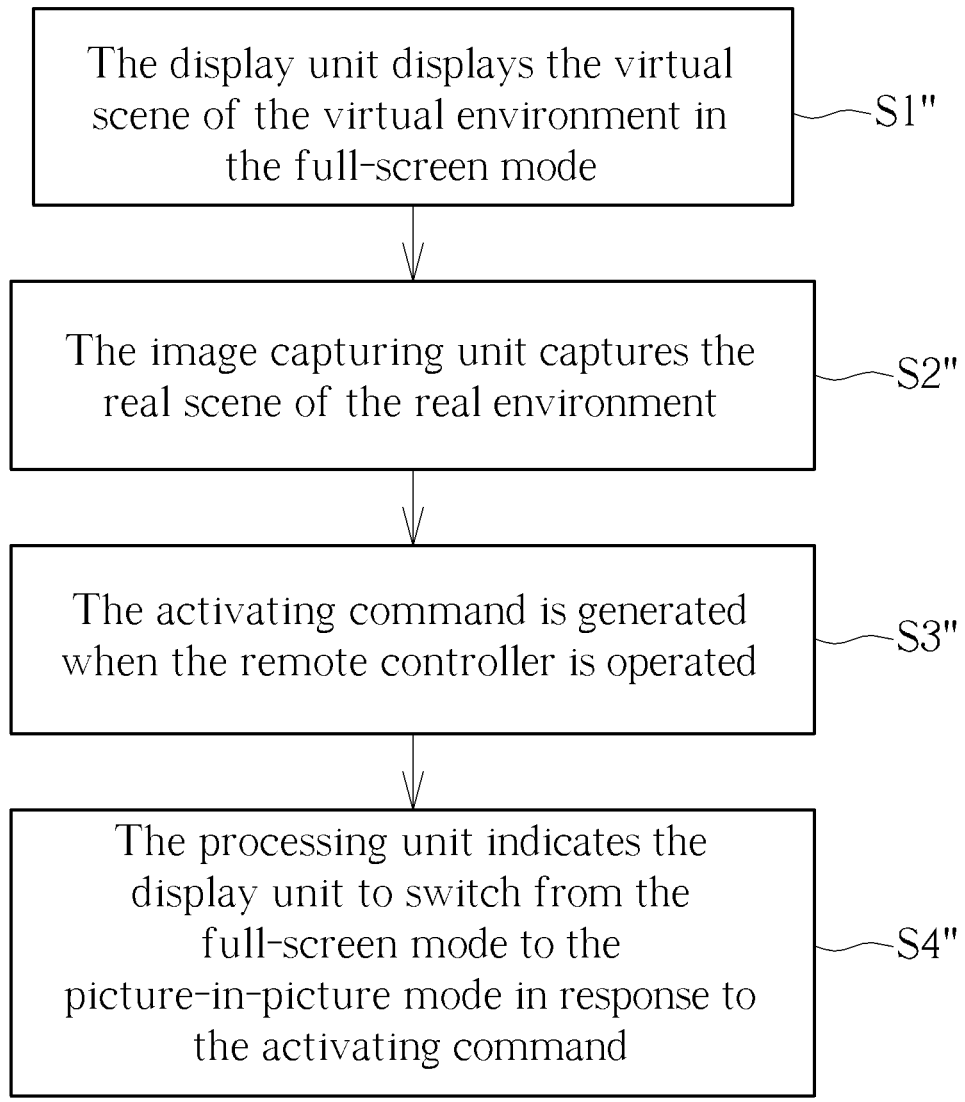
FIG. 11 is a flow chart diagram illustrating a method of switching the head mounted display system between a full-screen mode and a picture-in-picture mode according to the third embodiment of the present disclosure.

Please refer to FIG. 9 to FIG. 11. FIG. 9 is a diagram of a head mounted display system 1" according to a third embodiment of the present disclosure. FIG. 10 is a functional block diagram of the head mounted display system 1" according to the third embodiment of the present disclosure. FIG. 11 is a flow chart diagram illustrating a method of switching the head mounted display system 1" between a full-screen mode and a picture-in-picture mode according to the third embodiment of the present disclosure. As shown in FIG. 9 to FIG. 11, different from the head mounted display systems 1, 1' of the aforementioned embodiments, the head mounted display system 1" of this embodiment includes a wearable body 11", a display unit 12" mounted on the wearable body 11", a processing unit 13" coupled to the display unit 12", an image capturing unit 15" mounted on the wearable body 11" and coupled to the processing unit 13", a remote controller 17", a communication module 18" and a remote computing apparatus 19". The processing unit 13" can be configured on the remote computing apparatus 19". The communication module 18" constructs a communication channel among the processing unit 13" on the remote computing apparatus 19", the display unit 12" disposed on the wearable body 11" and the remote controller 17". In other words, the processing unit 13" is coupled to the display unit 12" and the image capturing unit 15" by the communication module 18" for indicating the display unit 12" to switch between the full-screen mode and the picture-in-picture mode, and the remote controller 17" is coupled to and communicated with the processing unit 13" by the communication module 18" for generating and transmitting the activating command remotely to the processing unit 13" via the communication module 18" when the remote controller 17" is operated. In other words, in this embodiment, the user can switch the display unit 12" from the full-screen mode to the picture-in-picture mode by operating the remote controller 17" according to practical demands. Furthermore, understandably, the user can switch the display unit 12" from the picture-in-picture mode to the full-screen mode by operating the remote controller 17" again.

Figure 12:
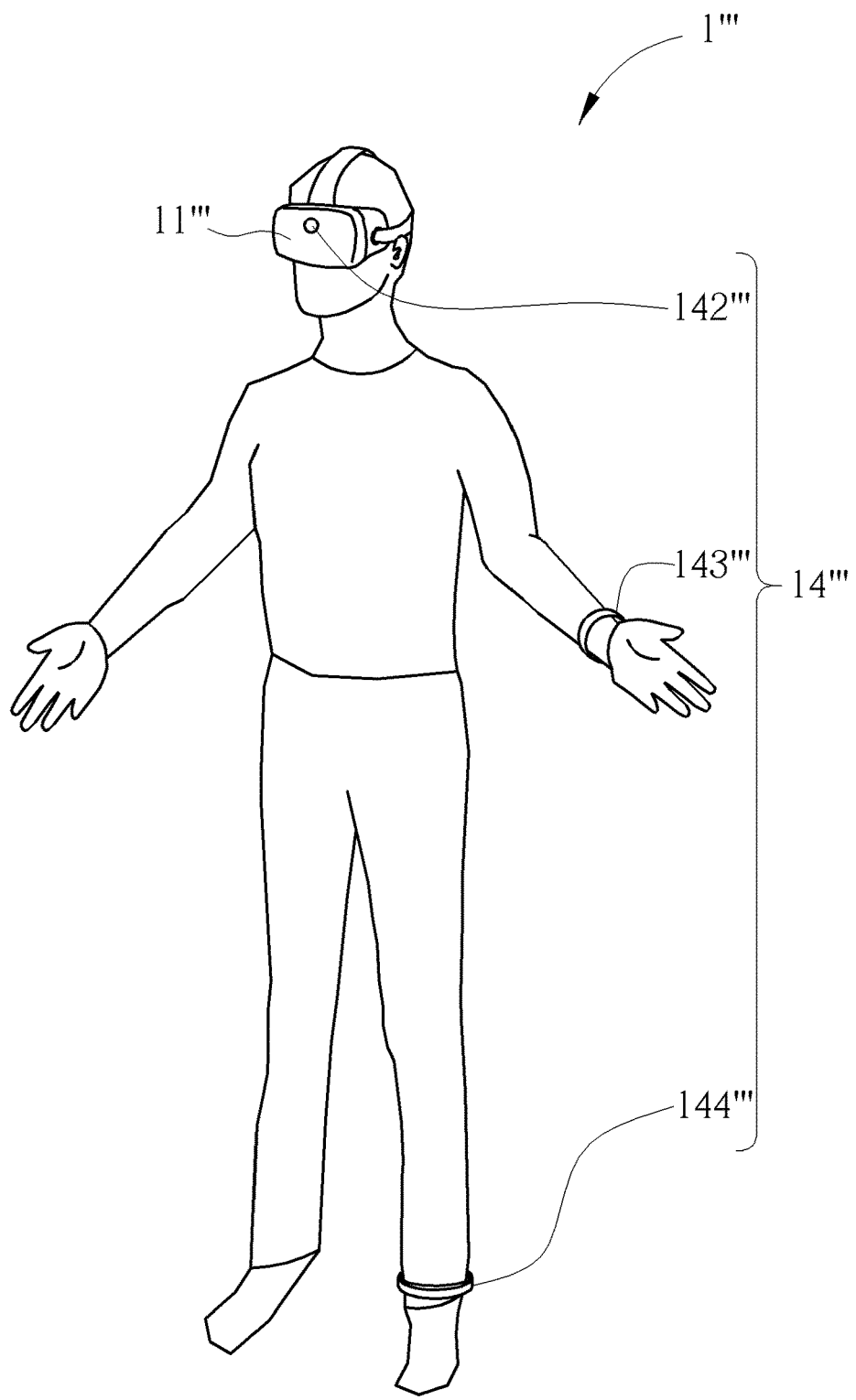
FIG. 12 is a diagram of a head mounted display system according to a fourth embodiment of the present disclosure.
Figure 13:
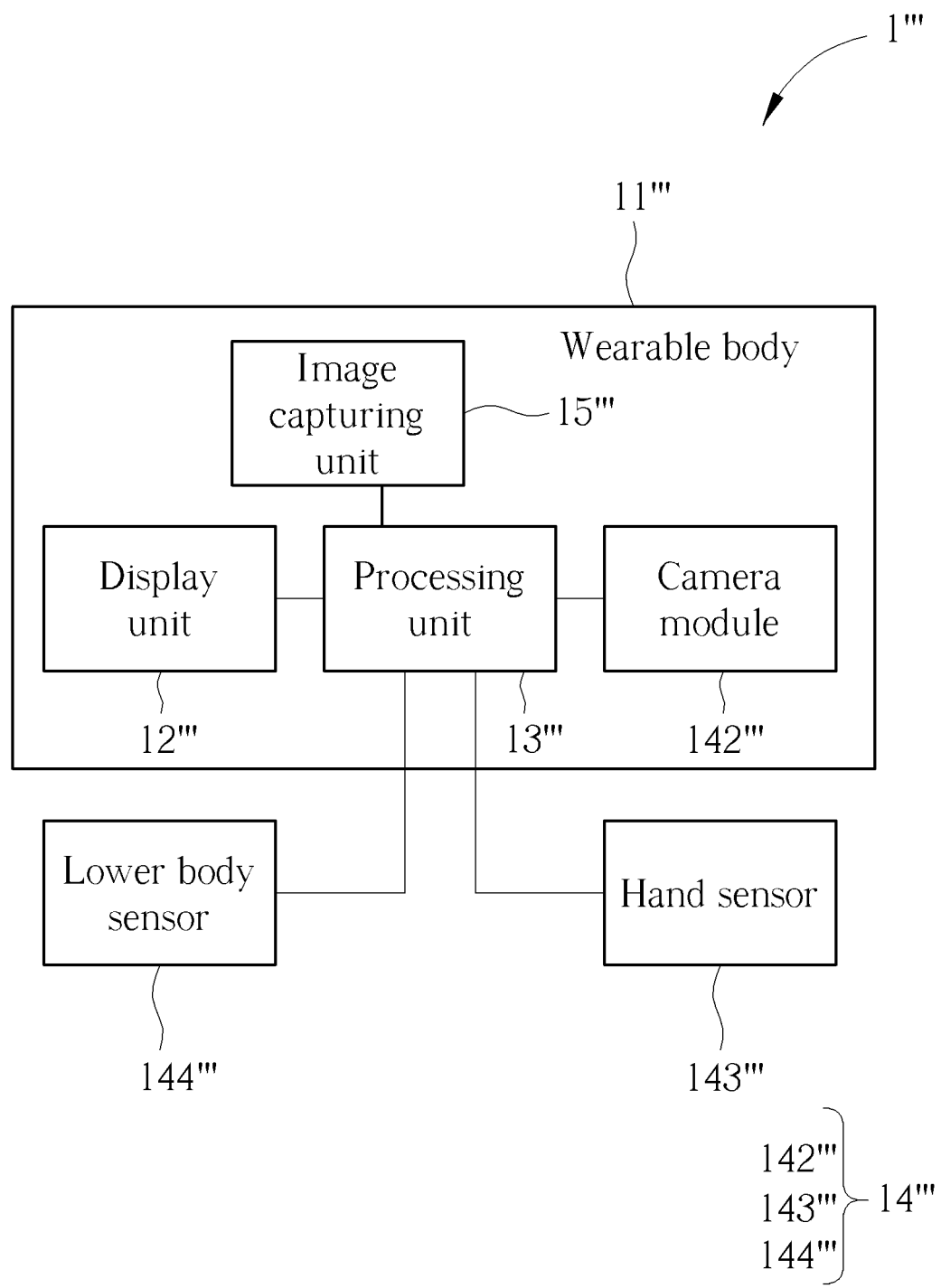
FIG. 13 is a functional block diagram of the head mounted display system according to the fourth embodiment of the present disclosure.
Figure 14:
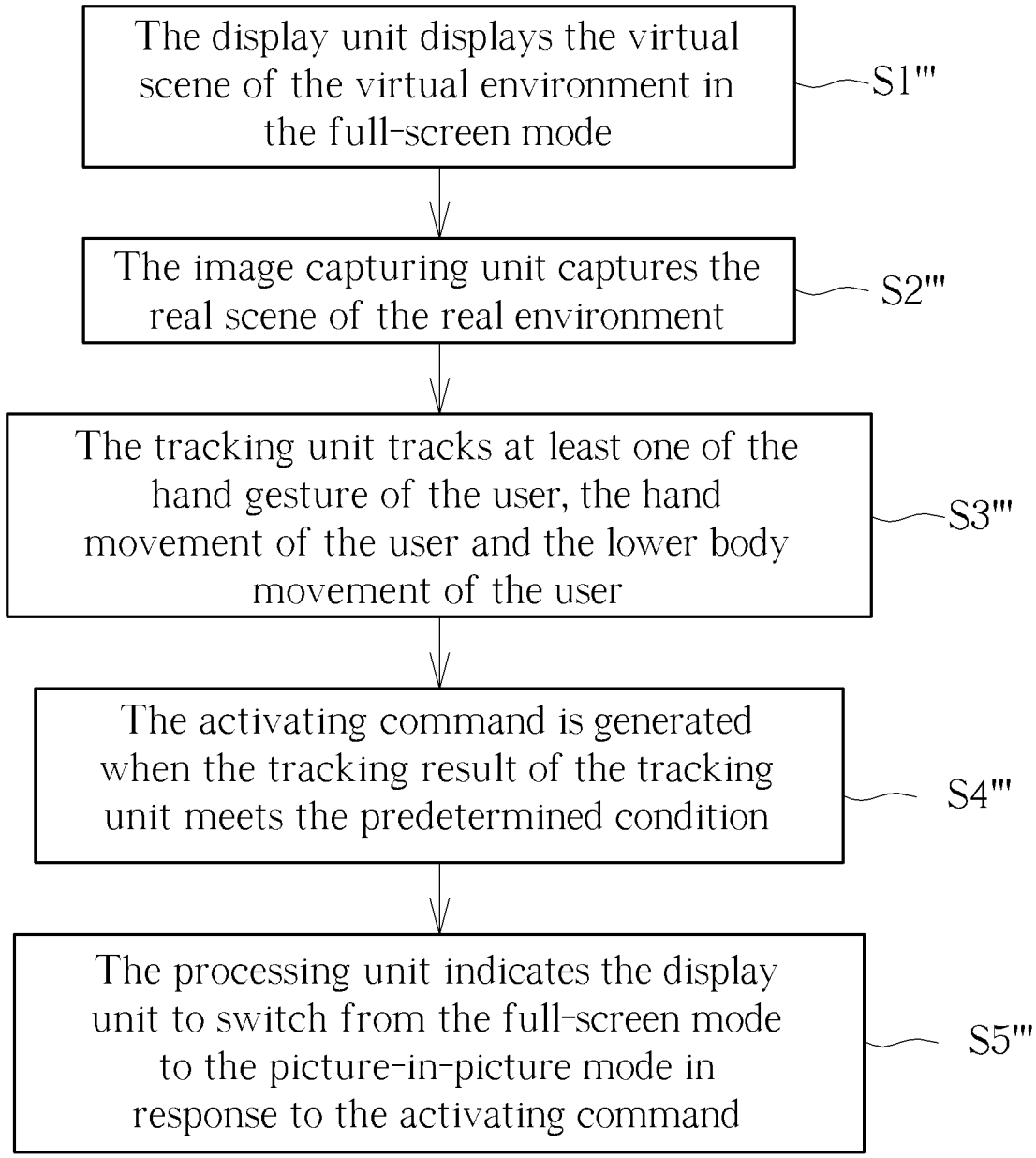
FIG. 14 is a flow chart diagram illustrating a method of switching the head mounted display system between a full-screen mode and a picture-in-picture mode according to the fourth embodiment of the present disclosure.

Please refer to FIG. 12 to FIG. 14. FIG. 12 is a diagram of a head mounted display system 1''' according to a fourth embodiment of the present disclosure. FIG. 13 is a functional block diagram of the head mounted display system 1''' according to the fourth embodiment of the present disclosure. FIG. 14 is a flow chart diagram illustrating a method of switching the head mounted display system 1''' between a full-screen mode and a picture-in-picture mode according to the fourth embodiment of the present disclosure. As shown in FIG. 12 to FIG. 14, different from the head mounted display system 1, 1', 1" of the aforementioned embodiments, the head mounted display system 1''' of this embodiment includes a wearable body 11''', a display unit 12', a processing unit 13', a tracking unit 14''' and an image capturing unit 15". The display unit 12', the processing unit 13''' and the image capturing unit 15''' are disposed on the wearable body 11'''. The processing unit 13''' is coupled to the display unit 12''' and the image capturing unit 15". The tracking unit 14''' includes a camera module 142''' coupled to the processing unit 13''' and disposed on the wearable body 11''', a hand sensor 143''' coupled to the processing unit 13''' and worn on the user's hand and a lower body sensor 144''' coupled to the processing unit 13''' and worn on the user's lower body for tracking at least one of the hand gesture of the user, the hand movement of the user and the lower body movement of the user, and the predetermined condition can refer to the predetermined hand gesture, the predetermined hand movement, the predetermined lower body movement, or a combination thereof. For example, the activating command can be generated when the hand gesture, the hand movement or the lower body movement of the user tracked by the tracking unit meets the predetermined hand gesture, the predetermined hand movement, or the predetermined lower body movement. However, the present disclosure is not limited thereto. The tracking unit can only include at least one of the camera module, the hand sensor and the lower body sensor. For example, in another embodiment, the camera module of the tracking unit can be omitted, and the tracking unit can be coupled to the image capturing unit, as to determine at least one of the hand gesture of the user, the hand movement of the user and the lower body movement of the user by the images captured by the image capturing unit, the hand sensor and the lower body sensor.

Figure 15:
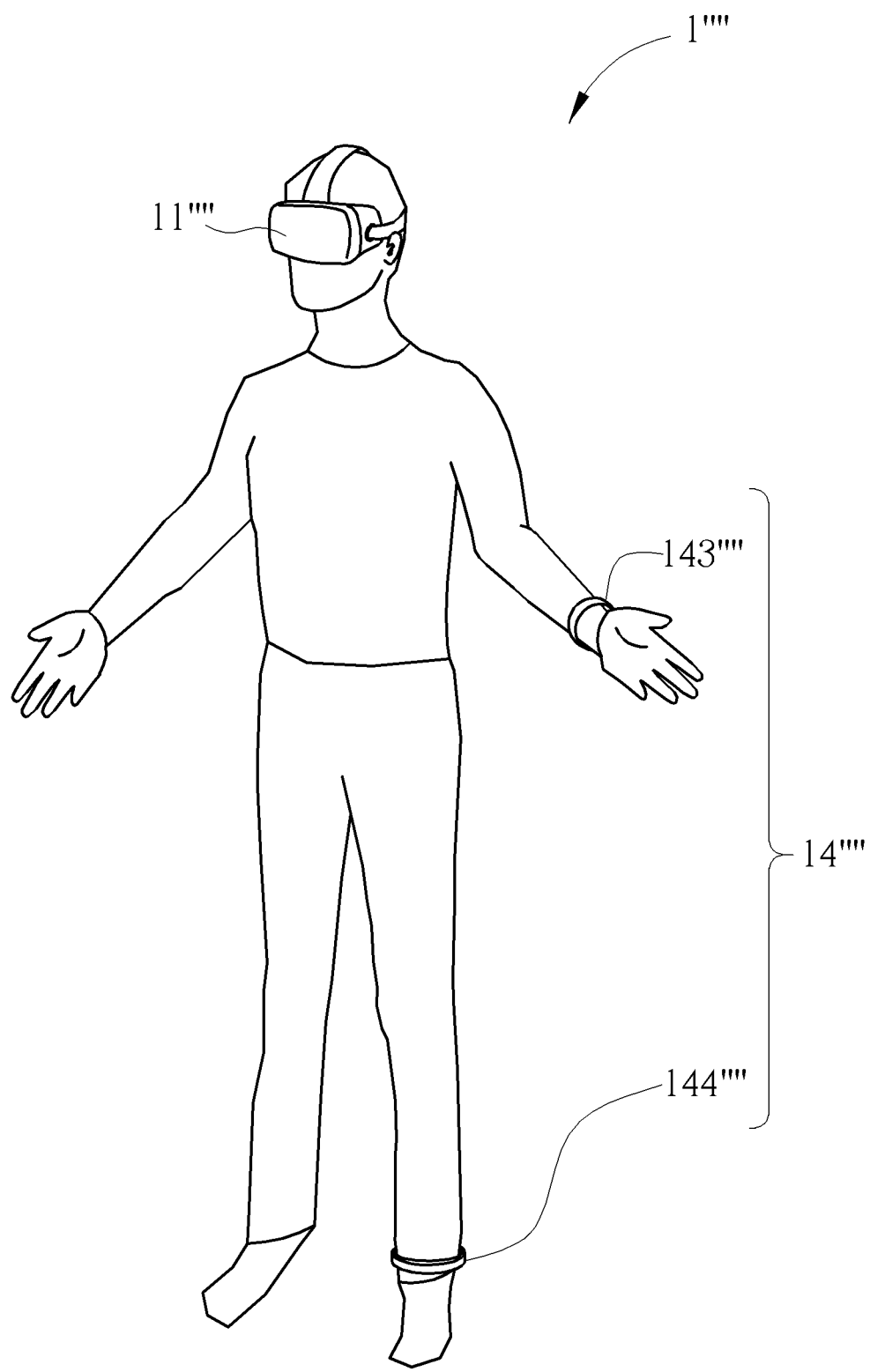
FIG. 15 is a diagram of a head mounted display system according to a fifth embodiment of the present disclosure.
Figure 16:
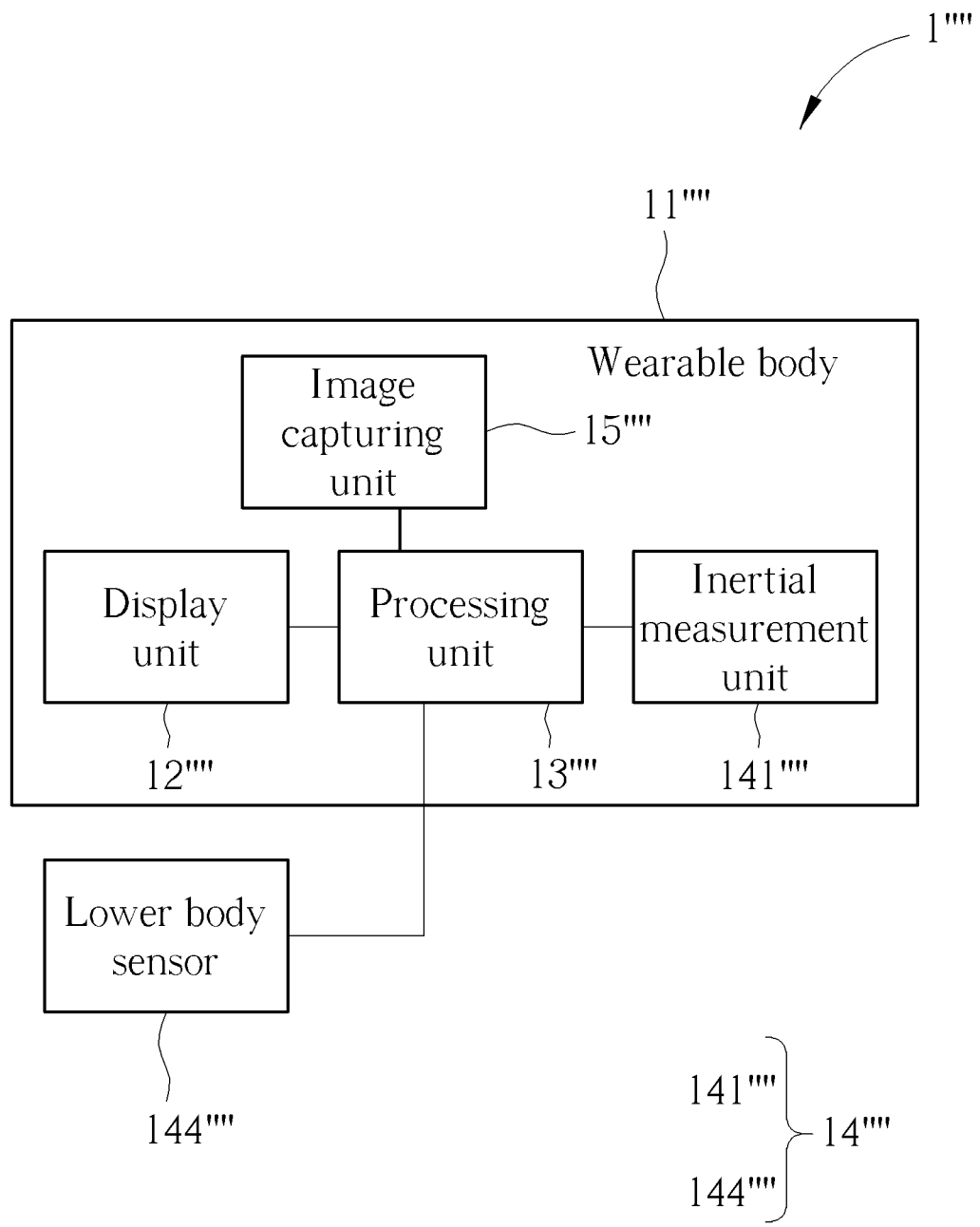
FIG. 16 is a functional block diagram of the head mounted display system according to the fifth embodiment of the present disclosure.
Figure 17:
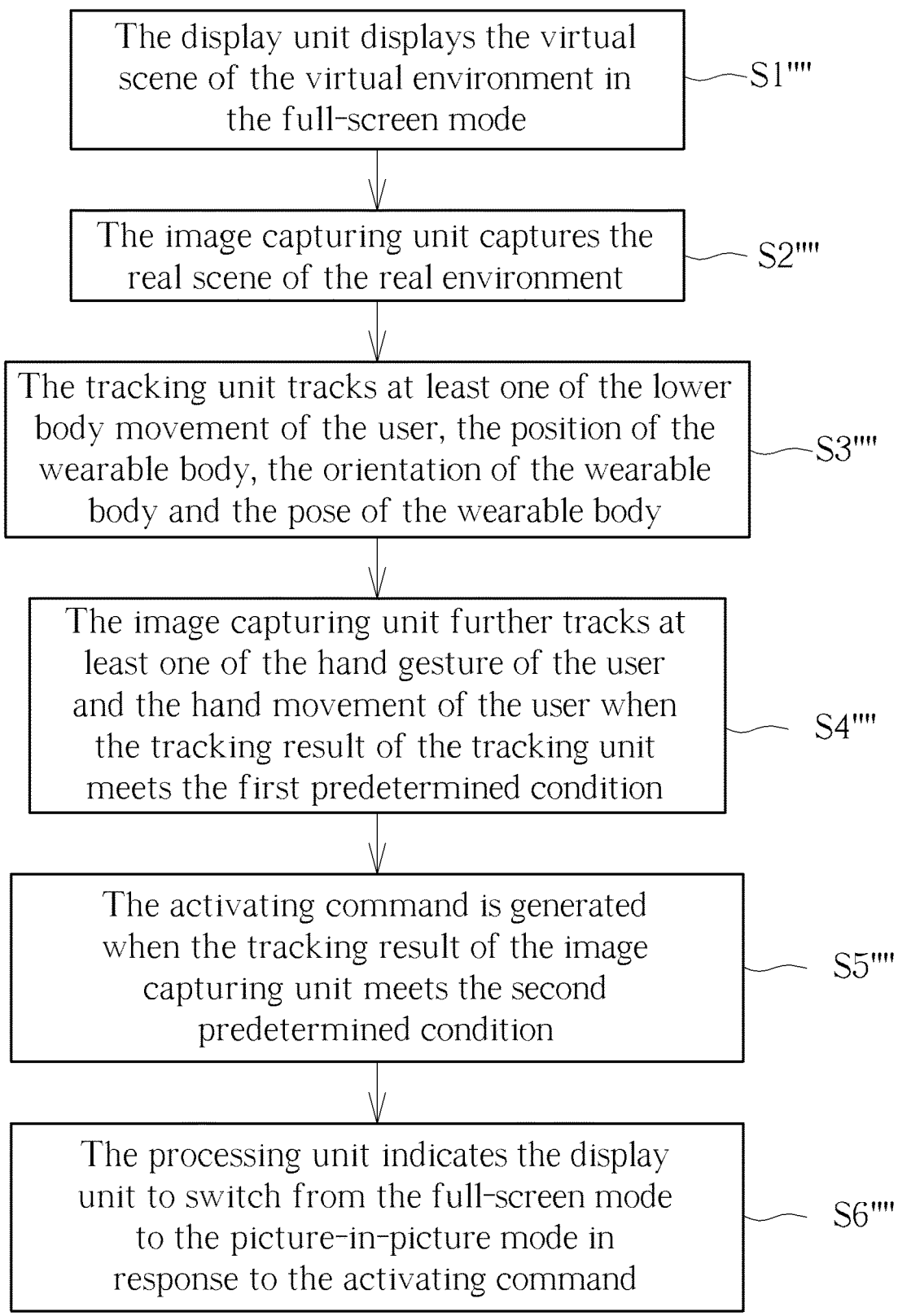
FIG. 17 is a flow chart diagram illustrating a method of switching the head mounted display system between a full-screen mode and a picture-in-picture mode according to the fifth embodiment of the present disclosure.

Please refer to FIG. 15 to FIG. 17. FIG. 15 is a diagram of a head mounted display system 1'''' according to a fifth embodiment of the present disclosure. FIG. 16 is a functional block diagram of the head mounted display system 1'''' according to the fifth embodiment of the present disclosure. FIG. 17 is a flowchart diagram illustrating a method of switching the head mounted display system 1'''' between a full-screen mode and a picture-in-picture mode according to the fifth embodiment of the present disclosure. As shown in FIG. 15 to FIG. 17, the head mounted display system 1'''' of this embodiment includes a wearable body 11'''', a display unit 12'''', a processing unit 13'''', a tracking unit 14'''' and an image capturing unit 15''''. The display unit 12'''', the processing unit 13'''' and the image capturing unit 15'''' are disposed on the wearable body 11''''. The processing unit 13'''' is coupled to the display unit 12'''' and the image capturing unit 15''''. The tracking unit 14'''' includes an inertial measurement unit 141'''' coupled to the processing unit 13'''', and a lower body sensor 144'''' coupled to the processing unit 13'''' and worn on the user's lower body for tracking at least one of the lower body movement of the user, the position of the head mounted display system 1'''', the orientation of the head mounted display system 1'''', the pose of the head mounted display system 1''''. The image capturing unit 15'''' includes a camera module and configured to track at least one of the hand gesture and the hand movement of the user. The activating command can be generated when a tracking result of the tracking unit 14'''' and a tracking result of the image capturing unit 15'''' respectively meet a first predetermined condition and a second predetermined condition. The first predetermined condition can refer to a predetermined distance, a predetermined position of the head mounted display system 1'''', a predetermined orientation of the head mounted display system 1'''' or a predetermined pose of the head mounted display system 1'''', and the second predetermined condition can refer to a predetermined hand gesture, a predetermined hand movement, and a predetermined lower body movement.

In this embodiment, the inertial measurement unit 141'''' can be mounted on the wearable body 11'''', so that the tracking unit 14'''' can track the position, the orientation or the pose of the wearable body 11'''' to determine the position, the orientation or the pose of the head mounted display system 1''''.

Furthermore, determination of the generation of the activation command can be a multi-stage operation, for example, two-stage operation. For example, when the tracking unit 14'''' determines a distance between the wearable body 11'''' and a real object is less than the predetermined distance, the image capturing unit 15'''' further determines whether the hand gesture of the user matches with the predetermined hand gesture. When the image capturing unit 15'''' determines the hand gesture of the user matches with the predetermined hand gesture, the activating command is generated. However, the present disclosure is not limited to this embodiment. In another embodiment, the determination of the generation of the activation command can be one-stage operation, i.e., the activating command can be generated when the tracking result of the tracking unit and the tracking result of the image capturing unit respectively meet the first predetermined condition and the second predetermined condition at a same time.

Furthermore, the above-described embodiments of the present disclosure can be implemented in software, firmware, hardware configuration, or combination thereof, and it is also possible to provide a non-transitory computer readable storage medium for storing a program that causes a head mounted display system to execute a process by a processor in accordance with the above-described methods of the present disclosure. The processor can be a central processing unit, an application processor, a microprocessor, etc., or can be realized by an application specific integrated circuit (ASIC). The computer-readable recording medium can be a Read-Only Memory (ROM), a random-access memory (RAM), a CD-ROM, a magnetic tape, a floppy disk, or an optical data storage device. However, the present disclosure is not limited thereto.

In contrast to the prior art, the present disclosure utilizes the display unit to display the virtual scene in the full-screen mode or display the virtual scene and the real scene combined in the same video frame synchronously in the picture-in-picture mode and further utilizes the processing unit to indicate the display unit to switch between the full-screen mode and the picture-in-picture mode in response to the activating command. Therefore, it allows the user to switch the display unit between the full-screen mode and the picture-in-picture mode by different ways to help the user to understand the current position or the current state of the user in the real environment, which effectively ensure the user's safety and prevents injuries caused by collision when the user experiences the virtual environment.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A head mounted display system comprising:
   a wearable body configured to be worn by a user;
   an image capturing unit mounted on the wearable body and configured to capture a real scene and further to track at least one of a hand gesture of the user and a hand movement of the user; and
   a display unit mounted on the wearable body, the display unit being configured to display a virtual scene and the real scene in a picture-in-picture mode; and
   a processing unit coupled to the image capturing unit and the display unit;
   wherein at least one of a size and a location of a window of the real scene displayed in the picture-in-picture mode is adjusted when a tracking result of the image capturing unit meets a predetermined adjusting condition.

2. The head mounted display system of claim 1, wherein the display unit is further configured to display the virtual scene in a full-screen mode, and the processing unit is configured to indicate the display unit to switch between the full-screen mode and the picture-in-picture mode in response to an activating command.

3. The head mounted display system of claim 2, further comprising a switch unit coupled to the processing unit and configured to generate the activating command when a state of the switch unit is changed.

4. The head mounted display system of claim 2, further comprising a remote controller communicated with the processing unit and configured to generate the activating command when the remote controller is operated.

5. The head mounted display system of claim 2, wherein the image capturing unit is further configured to track at least one of a lower body movement of the user, a position of the head mounted display system, an orientation of the head mounted display system and a pose of the head mounted display system, and the activating command is generated when the tracking result of the image capturing unit meets a predetermined condition.

6. The head mounted display system of claim 2, further comprising:
   a tracking unit coupled to the processing unit and configured to track at least one of the hand gesture of the user, the hand movement of the user, a lower body movement of the user, a position of the head mounted display system, an orientation of the head mounted display system and a pose of the head mounted display system;
   wherein the activating command is generated when a tracking result of the tracking unit meets a predetermined condition.

7. The head mounted display system of claim 2, further comprising:
   a tracking unit coupled to the processing unit and configured to track at least one of a lower body movement of the user, a position of the head mounted display system, an orientation of the head mounted display system, a pose of the head mounted display system;
   wherein the activating command is generated when a tracking result of the tracking unit and the tracking result of the image capturing unit respectively meet a first predetermined condition and a second predetermined condition.

8. The head mounted display system of claim 1, further comprising:
   a remote computing apparatus not disposed on the wearable body; and
   a communication module disposed on the wearable body for constructing a communication channel to the remote computing apparatus;
   wherein the processing unit is at least partly disposed on the remote computing apparatus.

9. A method of utilizing a head mounted display system to display a virtual scene and a real scene in a picture-in-picture mode, the method comprising:
   utilizing an image capturing unit of the head mounted display system to capture the real scene and further to track at least one of a hand gesture of a user and a hand movement of the user;
   utilizing a display unit of the head mounted display system to display the virtual scene and the real scene in the picture-in-picture mode; and
   adjusting at least one of a size and a location of a window of the real scene displayed in the picture-in-picture mode when a tracking result of the image capturing unit meets a predetermined adjusting condition.

10. The method of claim 9, further comprising:
    utilizing the display unit to display the virtual scene in a full-screen mode; and
    utilizing a processing unit of the head mounted display system to indicate the display unit to switch between the full-screen mode and the picture-in-picture mode in response to an activating command.

11. The method of claim 10, further comprising:
    utilizing a switch unit of the head mounted display system to generate the activating command when a state of the switch unit is changed.

12. The method of claim 10, further comprising:
    utilizing a remote controller of the head mounted display system to generate the activating command when the remote controller is operated.

13. The method of claim 10, further comprising:
    utilizing the image capturing unit to track at least one of, a lower body movement of the user, a position of the head mounted display system, an orientation of the head mounted display system and a pose of the head mounted display system; and
    generating the activating command when the tracking result of the image capturing unit meets a predetermined condition.

14. The method of claim 10, further comprising:
    utilizing a tracking unit of the head mounted display system to track at least one of the hand gesture of the user, the hand movement of the user, a lower body movement of the user, a position of the head mounted display system, an orientation of the head mounted display system and a pose of the head mounted display system; and
    generating the activating command when a tracking result of the tracking unit meets a predetermined condition.

15. The method of claim 10, further comprising:
    utilizing a tracking unit of the head mounted display system to track at least one of a lower body movement of the user, a position of the head mounted display system, an orientation of the head mounted display system and a pose of the head mounted display system; and
    generating the activating command when a tracking result of the tracking unit and the tracking result of the image capturing unit respectively meet a first predetermined condition and a second predetermined condition.

16. A non-transitory computer readable storage medium storing a program that causes a head mounted display system to execute a process, the process comprising:
    utilizing an image capturing unit of the head mounted display system to capture a real scene and further to track at least one of a hand gesture of a user and a hand movement of the user;
    utilizing a display unit of the head mounted display system to display a virtual scene and the real scene in a picture-in-picture mode; and
    adjusting at least one of a size and a location of a window of the real scene displayed in the picture-in-picture mode when a tracking result of the image capturing unit meets a predetermined adjusting condition.

17. The non-transitory computer readable storage medium of claim 16, wherein the process further comprises:
    utilizing the display unit to display the virtual scene in a full-screen mode; and
    utilizing a processing unit of the head mounted display system to indicate the display unit to switch between the full-screen mode and the picture-in-picture mode in response to an activating command.

18. The non-transitory computer readable storage medium of claim 17, wherein the process further comprises:
    utilizing a switch unit of the head mounted display system to generate the activating command when a state of the switch unit is changed.

19. The non-transitory computer readable storage medium of claim 17, wherein the process further comprises:
    utilizing a remote controller of the head mounted display system to generate the activating command when the remote controller is operated.

20. The non-transitory computer readable storage medium of claim 17, wherein the process further comprises:
    utilizing the image capturing unit to track at least one of, a lower body movement of the user, a position of the head mounted display system, an orientation of the head mounted display system and a pose of the head mounted display system; and
    generating the activating command when the tracking result of the image capturing unit meets a predetermined condition.

21. The non-transitory computer readable storage medium of claim 17, wherein the process further comprises:
    utilizing a tracking unit of the head mounted display system to track at least one of the hand gesture of the user, the hand movement of the user, a lower body movement of the user, a position of the head mounted display system, an orientation of the head mounted display system and a pose of the head mounted display system; and
    generating the activating command when a tracking result of the tracking unit meets a predetermined condition.

22. The non-transitory computer readable storage medium of claim 17, wherein the process further comprises:
    utilizing a tracking unit of the head mounted display system to track at least one of a lower body movement of the user, a position of the head mounted display system, an orientation of the head mounted display system and a pose of the head mounted display system; and
    generating the activating command when a tracking result of the tracking unit and the tracking result of the image capturing unit respectively meet a first predetermined condition and a second predetermined condition.

* * * * *